(12) United States Patent
Velecky et al.

(10) Patent No.: US 10,571,056 B2
(45) Date of Patent: Feb. 25, 2020

(54) CLAMP HAVING A CLAMP BAND AND A PRE-POSITIONER

(71) Applicant: NORMA GERMANY GMBH, Maintal (DE)

(72) Inventors: Radoslav Velecky, Hustopece (CZ); Simon Lukuvka, Krnov (CZ); Fabio Ghirardi, Hanau (DE)

(73) Assignee: NORMA GERMANY GMBH, Maintal (DE)

( * ) Notice: Subject to any disclaimer, the term of this patent is extended or adjusted under 35 U.S.C. 154(b) by 56 days.

(21) Appl. No.: 15/736,714

(22) PCT Filed: Apr. 12, 2016

(86) PCT No.: PCT/EP2016/057968
§ 371 (c)(1),
(2) Date: Dec. 14, 2017

(87) PCT Pub. No.: WO2016/202478
PCT Pub. Date: Dec. 22, 2016

(65) Prior Publication Data
US 2018/0156368 A1 Jun. 7, 2018

(30) Foreign Application Priority Data
Jun. 15, 2015 (DE) .......... 10 2015 109 470

(51) Int. Cl.
*F16L 23/08* (2006.01)
*F16L 33/10* (2006.01)
*F16L 23/00* (2006.01)

(52) U.S. Cl.
CPC .............. *F16L 23/08* (2013.01); *F16L 33/10* (2013.01); *F16L 23/003* (2013.01)

(58) Field of Classification Search
CPC .... F16B 7/0406; F16B 7/04; F16B 2200/509; F16L 23/08; F16L 23/04; F16L 23/10;
(Continued)

(56) References Cited

U.S. PATENT DOCUMENTS

| 9,494,265 B2 | 11/2016 | Ghirardi et al. | |
| 2008/0098575 A1* | 5/2008 | Krauss | F16L 33/08 |
| | | | 24/279 |

FOREIGN PATENT DOCUMENTS

| DE | 202013001224 U1 | 2/2013 |
| EP | 1 912 008 A2 | 4/2008 |

(Continued)

OTHER PUBLICATIONS

International Searching Authority, "International Search Report and Written Opinion of the International Searching Authority," issued for PCT/EP2016/057968 dated Jun. 15, 2016 (15 pages).

(Continued)

*Primary Examiner* — Jack W Lavinder
(74) *Attorney, Agent, or Firm* — Loeb & Loeb LLP

(57) ABSTRACT

The invention relates to a clamp, comprising a clamp band and a pre-positioner, wherein the pre-positioner is designed as a supporting band, which has a partial-circle-shaped region, which extends over more than 180°. In order to enable simple production and to prevent loss of the pre-positioner, the supporting band has, at each end thereof, a fastening region bent in relation to the partial-circle-shaped region, wherein the fastening regions are fastened on the same side of the clamp band.

10 Claims, 1 Drawing Sheet

(58) Field of Classification Search
CPC ......... F16L 23/162; F16L 23/16; F16L 23/20;
F16L 33/10; F16L 23/003; F16L 23/05;
Y10T 24/1439
USPC .......................................... 285/420, 252, 23
See application file for complete search history.

(56) References Cited

FOREIGN PATENT DOCUMENTS

| | | |
|---|---|---|
| JP | 3184161 | 6/2013 |
| KR | 1020140100896 | 8/2014 |
| WO | 99/09344 A1 | 2/1999 |

OTHER PUBLICATIONS

Office Action and Translation for corresponding Japanese Application No. 2017-563965, dated Dec. 11, 2018, 8 pages.
Korean Office Action (including English language translation) for Application No. 10-2017-703-4027, dated Jun. 27, 2019, 13 pages.

* cited by examiner

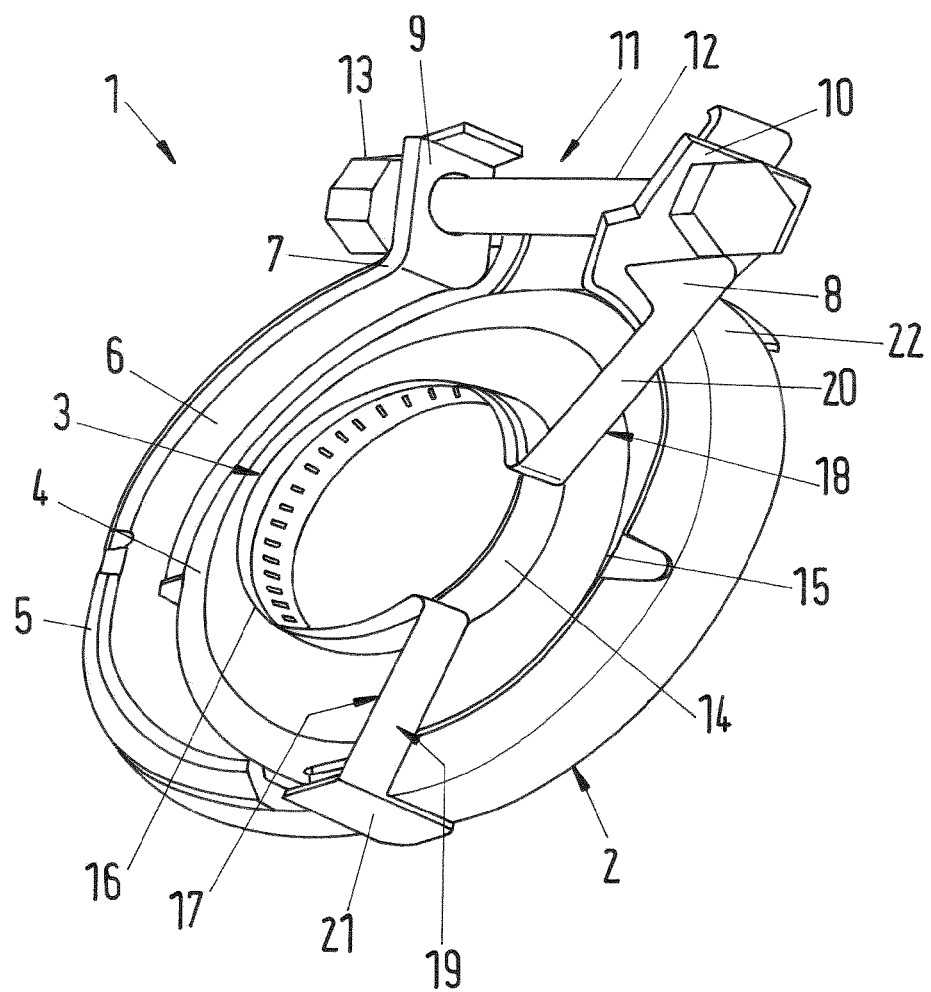

CLAMP HAVING A CLAMP BAND AND A PRE-POSITIONER

FIELD OF THE INVENTION

The invention relates to a clamp having a clamp band and a pre-positioner having the features of the preamble of claim 1.

BACKGROUND

Clamps, in particular profile clamps or tension clamps, serve to secure pipe and hose ends. There is introduced via the clamp a radial retention force which in the case of profile clamps is supplemented by an axial retention force. Profile clamps are in this instance generally used for connecting two lines which have connection flanges at the ends thereof. The profile clamp in this instance engages around the connection flanges at the end faces thereof facing away from each other and presses them together. To this end, the profile clamp generally has a clamp band with a V-shaped or trapezoidal profile.

Clamps which are constructed as tension clamps generally have a flat clamp band which can be positioned in a planar manner on a line end. Using such clamps, line ends are, for example, secured to pipe connecting pieces and the like.

SUMMARY

In order to simplify the assembly, in particular under narrow spatial conditions, it is known to already secure the clamp using a pre-positioner before clamping to the line. In DE 10 2008 047 038 A1, it is, for example, proposed to provide the pre-positioner with a radially inwardly protruding hook-like tip which is pressed into the line and which thus retains the clamp already in the non-tensioned state on the line. However, this embodiment leads to damage to the line and cannot be used with profile clamps which require a radial movability of the clamp in order to engage over the connection flanges.

In DE 20 2013 001 224 U1, there is proposed a profile clamp with a pre-positioner which has a carrier band which extends with a part-circle-like region over more than 180 degrees. From this part-circle-like region, there extend in an axial direction securing regions which connect the part-circle-like region to another part-circle-like region which is placed around a peripheral side of the clamp band. The pre-positioner is thereby secured to the clamp band.

The production of such a pre-positioner with two part-circle-like regions is relatively complex. Furthermore, there is the risk that such a pre-positioner may become unintentionally released from the clamp.

An object of the invention is to overcome the disadvantages of the prior art and to provide a clamp having a pre-positioner which can be used universally and which can be pre-positioned with a high level of reliability. Furthermore, it is intended to be able to be produced with the lowest possible complexity and consequently produced in a cost-effective manner.

According to the invention, this object is achieved with a clamp having the features of claim 1. Advantageous embodiments are set out in the dependent claims.

With a clamp having a clamp band and a pre-positioner, wherein the pre-positioner is constructed as a carrier band which has a part-circle-like region, there is provision according to the invention for the carrier band of the pre-positioner to have at each of the ends thereof a securing region which is bent with respect to the part-circle-like region, wherein the securing regions are secured at the same side of the clamp band.

Therefore, the pre-positioner or the carrier band is consequently retained on the clamp band in a secure and consequently non-releasable manner, wherein the securing at one side of the clamp band, that is to say, at the same flank or a peripheral side, enables simple production. In this instance, the pre-positioner enables securing of the clamp to a line with radial play still being provided at the same time as a result of the flexibility of the bent securing regions. To this end, the part-circle-like region is arranged radially inside the clamp band and thus has a smaller diameter which substantially corresponds to the diameter which the clamp band takes up in the tensioned state. The carrier band extends, for example, over an angle of 180° or more.

In this instance, it is particularly preferable for the securing regions to be connected to the clamp band in a materially engaging manner, in particular welded. This constitutes a simple fixing which is very simple to produce. A loss or release of the pre-positioner from the clamp band is consequently reliably prevented.

In a preferred embodiment, the part-circle-like region is offset radially inside the clamp band and axially with respect to the clamp assembly, wherein the securing region comprises a radial portion which is located in a plane with the part-circle-like region and an axially extending axial portion. In this case, the radial portion enables as a result of resilient deformation a relatively large radial relative movement between the pre-positioner and clamp band without the clamp being able to become released from the line. A brief expansion of the part-circle-like region for engaging around the line is also thereby possible, wherein it is preferable in this case for the carrier band to subsequently be in abutment with a degree of pretensioning against the line and accordingly to be retained not only by means of positive-locking but also by means of non-positive-locking connection. The axial offset of the clamp band and carrier band enables in this case a universal use of this clamp, wherein the clamp may, for example, also be in abutment in a region of the line which has a different diameter from the region at which the pre-positioner engages. This is the case, for example, when the clamp is intended to act on a connection flange of the line.

Preferably, the radial portion is bent outward by more than 90 degrees with respect to the part-circle-like region. Consequently, a relatively large flexibility is achieved and at the same time an expansion of the part-circle-like region is enabled.

In order to achieve a relatively high degree of stability in an axial direction, that is to say, to keep a possible movement between the pre-positioner and clamp band small in an axial direction, the axial portion is preferably constructed to be wider than the radial portion. Whilst the radial portion is intended to be able to be resiliently deformed, this is generally not required in the axial direction. This is taken into account by a wide configuration of the axial portion and a pre-positioning of the clamp which is stable in an axial direction is achieved.

In a particularly advantageous manner, the pre-positioner, in particular the part-circle-like region and the radial portions, can be resiliently deformed. In order to secure the clamp, the pre-positioner can then be briefly expanded, wherein the carrier band with the part-circle-like region is subsequently in abutment with an outer side of the line. As a result of the resilient construction which can be achieved, for example, by using a metal sheet for the pre-positioner, the clamp can readily be used again. At the same time, in addition to a positive-locking connection, a frictionally engaging or non-positive-locking connection can also be produced between the pre-positioner and line. Consequently, a secure retention of the clamp is achieved.

In a preferred embodiment, the clamp is constructed as a tension clamp, wherein there is constructed at each of the ends of the clamp band a clamping jaw, which jaws are connected to each other by a clamping means. In this instance, it is possible to use as a clamping means, for example, a screw with a counter-nut. Such a clamp can be used in various manners and is capable of producing sufficiently high radially inwardly directed retention forces.

In another preferred embodiment, the clamp is constructed as a profile clamp, wherein the clamp band has two radially inwardly inclined flanks. Profile clamps may in particular be used to connect lines and also introduce axial forces in addition to radial forces and thus press line ends against each other.

Preferably, an open angular range of the carrier band is between 45 degrees and 90 degrees with the clamp in the non-tensioned state. The carrier band is then sufficiently flexible in order to be able to be expanded so far that it can be placed around a line. At the same time, after the placement, a secure positive-locking connection is achieved since the line cannot be removed through the open angular range without the carrier band being expanded again.

In this instance, it is particularly preferable for the open angular range of the carrier band to be offset in a peripheral direction with respect to a clamping region of the clamp band constructed between the clamping jaws. The securing regions of the pre-positioner are thereby located remote from a clamping means which may be provided and consequently do not impede operation. Consequently a relatively uniform loading of the line is achieved.

In this instance, it is particularly preferable for the securing portions to be secured to the clamp band in a state offset with respect to each other by less than 180 degrees in the peripheral direction. At the same time, however, there may be provision for them to be offset with respect to each other by more than 90 degrees, in particular more than 120 degrees. There is thereby produced, on the one hand, adequate flexibility of the securing portions in a radial direction, on the other hand, the part-circle-like region may be produced with a relatively large diameter. In particular, it consequently counteracts a tensioning of the clamps only with a small resistance.

BRIEF DESCRIPTION OF THE DRAWINGS

The invention is described in greater detail below with reference to a preferred embodiment together with the drawing, in which:

FIG. 1 is a three-dimensional illustration of a clamp with a pre-positioner.

DETAILED DESCRIPTION

FIG. 1 shows a clamp 1 with a clamp band 2 and a pre-positioner 3. The clamp 1 is constructed as a profile clamp, wherein the clamp band 2 has radially inwardly inclined flanks 4, 5 which extend from a base 6 which extends in a peripheral direction. At ends 7, 8 of the clamp band 2, there are formed clamping jaws 9, 10 which are connected to each other by way of a clamping means 11. The clamping means comprises a screw bolt 12 and a counter-nut 13.

By actuating the clamping means 11, the clamping jaws 9, 10 are moved toward each other, whereby the clamp band 2 is tensioned and a diameter of the clamp band 2 decreases.

The clamp 1 is pre-positioned via the pre-positioner 3 on a schematically illustrated line 14, wherein the line 14 has a radially outwardly protruding connection flange 15 which is intended to be engaged round by the clamp band 2.

The pre-positioner 3 has a part-circle-like region 16 by means of which it is placed around the line 14. From the part-circle-like region 16 there protrude in a symmetrical manner two securing regions 17, 18 which comprise a radial portion 19, 20 and an axial portion 21, 22. The part-circle-like region 16 with the securing regions 17, 18 is in this instance constructed as a carrier band and produced by means of corresponding deformation of the band. The radial portions are located in this instance in a plane with the part-circle-like region, whilst the axial portions extend perpendicularly to this plane. Accordingly, the axial portions 21, 22 ensure that the part-circle-like region 16 is kept axially spaced-apart with respect to the clamp band 2.

The axial portions 21, 22 of the carrier band 23 are welded to the base 6 of the clamp band 2. Alternatively, there could be provision for the securing regions 17, 18 to be connected in a materially engaging manner to one of the flanks 4, 5.

The securing positions of the axial portions 21, 22 with respect to the clamp band 2 are located offset with respect to each other in the peripheral direction, in particular at an angle between 90 and 180 degrees. Accordingly, the radial portions 19, 20 are inclined by more than 90 degrees relative to the part-circle-like region 16. A relatively high flexibility is thereby achieved in a radial direction, whilst, as a result of a great width of the axial portions 21, 22, a relatively high axial stability is obtained.

An open angular range of the carrier band 23 is located outside a clamping region of the clamp band which is bridged by the clamping means 11. An overloading of the lines is thus kept small.

The invention is not limited to the embodiment shown but can instead be modified in various manners. Thus, the clamp may, for example, also be constructed as a simple tension clamp with a flat clamp band. Furthermore, the pre-positioner may be produced from the same material as the clamp band, but it is also possible to use different materials.

LIST OF REFERENCE NUMERALS

1. Clamp
2. Clamp band
3. Pre-positioner
4. Flank
5. Flank
6. Base
7. End
8. End
9. Clamping jaw
10. Clamping jaw
11. Clamping means
12. Screw bolts
13. Counter-nut
14. Line
15. Connection flange
16. Part-circle-like region
17. Securing region 18. Securing region
19. Radial portion
20. Radial portion
21. Axial portion
22. Axial portion
23. Carrier band

The invention claimed is:

1. A clamp having:
    a clamp band; and
    a pre-positioner,
    wherein the pre-positioner is constructed as a carrier band which has a part-circle-like region, the carrier band has at each of the ends thereof a securing region which is bent with respect to the part-circle-like region, and the securing regions are secured at the same side of the clamp band, wherein an open angular range of the carrier band is offset in a peripheral direction with respect to a clamping region of the clamp band constructed between clamping jaws.

2. The clamp as claimed in claim 1, wherein the securing regions are connected to the clamp band in a materially engaging manner, including a welded manner.

3. The clamp as claimed in claim 2, wherein the part-circle-like region is offset radially inside the clamp band and axially with respect to the clamp band, and the securing region comprises a radial portion which is located in a plane with the part-circle-like region and an axially extending axial portion.

4. The clamp as claimed in claim 3, wherein the radial portion is bent outward by more than 90° with respect to the part-circle-like region.

5. The clamp as claimed in claim 4, wherein the axial portion is wider than the radial portion.

6. The clamp as claimed in claim 5, wherein the pre-positioner, in particular the part-circle-like region and the radial portions, can be resiliently deformed.

7. The clamp as claimed in claim 6, wherein the clamp is constructed as a tension clamp, and there is constructed at each of the ends of the clamp band a clamping jaw, which jaws are connected to each other by a clamping means.

8. The clamp as claimed in claim 7, wherein the clamp is constructed as a profile clamp and the clamp band has two radially inwardly inclined flanks.

9. The clamp as claimed in claim 8, wherein an open angular range of the carrier band is between 45° and 90° with the clamp in the non-tensioned state.

10. The clamp as claimed in claim 1, wherein the securing regions are secured to the clamp band in a state offset with respect to each other by less than 180° in the peripheral direction.

* * * * *